United States Patent [19]
Subramanian et al.

[11] Patent Number: 5,867,711
[45] Date of Patent: Feb. 2, 1999

[54] METHOD AND APPARATUS FOR TIME-REVERSED INSTRUCTION SCHEDULING WITH MODULO CONSTRAINTS IN AN OPTIMIZING COMPILER

[75] Inventors: Krishna Subramanian, Mountain View; Boris Baylin, Palo Alto, both of Calif.

[73] Assignee: Sun Microsystems, Inc., Mountain View, Calif.

[21] Appl. No.: 560,060

[22] Filed: Nov. 17, 1995

[51] Int. Cl.$^6$ .................................................. G06F 9/44
[52] U.S. Cl. ............................................................ 395/709
[58] Field of Search .................................. 395/709, 708, 395/705, 701

[56] References Cited

U.S. PATENT DOCUMENTS

| | | | |
|---|---|---|---|
| 5,265,253 | 11/1993 | Yamada | 395/709 |
| 5,339,238 | 8/1994 | Benson | 395/709 |
| 5,367,651 | 11/1994 | Smith et al. | 395/709 |
| 5,386,562 | 1/1995 | Jain et al. | 395/709 |
| 5,418,958 | 5/1995 | Goebel | 395/709 |
| 5,418,959 | 5/1995 | Smith et al. | 395/709 |
| 5,448,737 | 9/1995 | Burke et al. | 395/709 |
| 5,485,616 | 1/1996 | Burke et al. | 395/709 |
| 5,491,823 | 2/1996 | Ruttenberg | 395/709 |
| 5,606,698 | 2/1997 | Powell | 395/709 |

OTHER PUBLICATIONS

"Register Allocation for Modulo Scheduled Loops: Strategies, Algorithms and Heuristics", by B.R. Rau, M. Lee, P.P. Tirumalai, M.S. Schlansker, Computer Systems Laboratory, HPL–92–48, Apr. 1992, pp. 1–34.

"Parallelizations of WHILE Loops on Pipelined Architectures", by Parthasarathy P. Tirumalai Meng Lee, and Michael S. Schlansker, Hewlett–Packard Laboratories, The Journal of Supercomputing, 5. (1991), pp. 119–136.

"Code Genreation Schema for Modulo Scheduled Loops", B. Ramakrishna Rau, Michael S. Schlansker, P.P. Tirumalai, Hewlett–Packard Laboratories, 1992, pp. 158–169.

"UltraSparc Unleashes SPARC Performance", Next–Generation Design Could Put Sun Back in Race, by Linley Gwennap, Microprocessor Report, The Insiders Guide to Microprocessor Hardware, Oct. 3, 1994, vol. 8, No. 13, pp. 5–9.

"Partners in Platform Design", To create a successful new high–performance processor, the chip architects and compiler designers must collaborate from the project's very start, Focus Report, by Marc Tremblay and Partha Tirumalai, Sun Microsystems, Inc. IEEE Spectrum, Apr. 1995, pp. 20–26.

"Overlapped Loop Support in the Cydra5", by James C. Dehnert, Apogee Software, Inc., Peter Y.T. Hsu, Sun Microsystems, Inc., and Joseph P. Bratt, Ardent Computer, pp. 26–38, 1989, ACM.

"Parallelization of Loops With Exits On Pipelined Architectures", by P. Tirumalai, M. Lee, M.S. Schlansker, Hewlett–Packard Laboratories, 1990, pp. 200–212.

(List continued on next page.)

*Primary Examiner*—Kevin A. Kriess
*Attorney, Agent, or Firm*—Erwin J. Basinski

[57] ABSTRACT

Apparatus and methods are disclosed for performing time-reversed scheduling of a data dependency graph representing a target program instruction loop in an optimizing compiler. The instruction scheduling function is the modulo scheduling function of an optimizing compiler and it is noted that the time-reverse transforms preserve all modulo constraints. Most modern microprocessors have the ability to issue multiple instructions in one clock cycle and/or possess multiple pipelined functional units and typically contain multi-level memory devices such as on-chip cache, off-chip cache as well as main memory. For such microprocessors this invention can, where applicable, accelerate the process of modulo-scheduling loops in the target program code. The invention consists of a technique to transform the data dependency graph of the target program instruction loop in order to produce an improved schedule of the loop instructions.

8 Claims, 6 Drawing Sheets

OTHER PUBLICATIONS

"The Cydra5 Departmental Supercomputer", Design Philosophies, Decisions, and Trade–offs, by B. Ramakrishna Rau, David W.L. Yen, Wei Yen, and Ross A. Towle, Cydrome, Inc., Computer, Jan. 1989, pp. 12–35.

"Sentinel Scheduling for VLIW and Superscalar Processors", by Scott A. Mahike, William Y. Chen, Wen–mei W. Hwu, B. Ramakrishna Rau, and Michael S. Schlansker, Hewlett–Packard Laboratories, Center for Reliable and High–Performance Computing, Universityof Ill., 1992, pp. 238–247.

"Conversion of Control Dependence to Data Dependance", by J.R. Allen, Ken Kennedy, Carrie Porterfield & Joe Warren, Depart. of Mathematical Sciences, Rice University, IBM Corporation, 1983, pp. 177–189.

"Register Allocation for Software Pipelined Loops", by B. R. Rau, M. Lee, P.P. Tirumalai, & M.S. Schlansker, Hewlett–Packard Laboratories, SIGPLAN 1992, pp. 283–299.

"Some Scheduling Techniques and An Easily Schedulable Horizontal Architecture For High Performance Scientific Computing", by B.R. Rau, and C.D. Glaeser, Advanced Processor Technology Group, ESL, Inc., Oct. 1981, pp. 183–198.

"Software Pipelining: An Effective Scheduling Technique for VLIW Machine", by Monica Lam, Depart. of Computer Science, Carnegie Mellon University, Proceedings of the SIGPLAN '88 Conference on Programming Language Design and Implementation, Jun. 22–24, 1988, pp. 318–328.

"Counterflow Pipeline Processor Architecture", Robert F. Sproull, Ivan E. Sutherland, and Charles E. Molnar, Sun Microsystems Laboratories, Inc., Apr. 1994, pp. 1–21.

"Compiler Design In C", by Allen I Holub, Prentice Hall Software Series, 1990, pp. 673–679.

Execution of a four-stage seven iteration pipeline.

METHOD AND APPARATUS FOR TIME-REVERSED INSTRUCTION SCHEDULING WITH MODULO CONSTRAINTS IN AN OPTIMIZING COMPILER

FIELD OF THE INVENTION

This invention relates to the field of Optimizing Compilers for computer systems. More specifically, the invention is an improved method and apparatus for scheduling target program instructions during the code optimization pass of an optimizing compiler by reverse time scheduling the instruction dependencies in a data dependency graph observing modulo constraints.

BACKGROUND

It is desirable that computer programs be as efficient as possible in their execution time and memory usage. This need has spawned the development of computer architectures capable of executing target program instructions in parallel. A recent trend in processor design is to build processors with increasing instruction issue capability and many functional units. Some examples of such designs are Sun's UltraSparc™ (4 issue), IBM's PowerPC™ series (2–4 issue), MIPS' R10000™ (5issue) and Intel's Pentium-Pro™ (aka P6) (3 issue). (These processor names are the trademarks respectively of Sun Microsystems, Inc., IBM Corporation, MIPS Technologies, Inc., and Intel Corporation). At the same time the push toward higher clock frequencies has resulted in deeper pipelines and longer instruction latencies. These and other computer processor architectures contain multiple functional units such as I/O memory ports, integer adders, floating point adders, multipliers, etc. which permit multiple operations to be executed in the same machine cycle. The process of optimizing the target program's execution speed becomes one of scheduling the execution of the target program instructions to take advantage of these multiple computing resource units or processing pipelines. This task of scheduling these instructions is performed as one function of an optimizing compiler. Optimizing compilers typically contain a Code Optimization section which sits between a compiler front end and a compiler back end. The Code Optimization section takes as input the "intermediate code" output by the compiler front end, and operates on this code to perform various transformations to it which will result in a faster and more efficient target program. The transformed code is passed to the compiler back end which then converts the code to a binary version for the particular machine involved (i.e. SPARC, X86, IBM, etc). The Code Optimization section itself needs to be as fast and memory efficient as it possibly can be and needs some indication of the computer resource units available and pipelining capability of the computer platform for which the target program code is written.

In the past, attempts have been made to develop optimizing compilers generally, and code optimizer modules specifically which themselves run as efficiently as possible. A general discussion of optimizing compilers and the related techniques used can be found in the text book "Compilers: Principles, Techniques and Tools" by Alfred V. Aho, Ravi Sethi andJeffrey D. Ullman, Addison-Wesley Publishing Co 1988, ISBN 0-201-10088-6, especially chapters 9 & 10 pages 513–723. One such attempt at optimizing the scheduling of instructions in inner loops in computer platforms with one or more pipelined functional units is a technique called "modulo scheduling." Modulo scheduling is known in the art and is generally described in the paper entitled "Some Scheduling Techniques and An Easily Schedulable Horizontal Architecture For High Performance Scientific Computing" by Rau B. R. and Glaeser, C. D., Proceedings of Fourteen Annual Workshop on Microprogramming, Advanced Processor Technology Group, ESL, Inc. October 1981, Pages 183–198 which is incorporated fully herein by reference. Modulo scheduling is one form of software pipelining that extracts instruction level parallelism from inner loops by overlapping the execution of successive iterations.

The modulo schedule is derived by traversing the data dependency graph for the loop assigning time-stamps to the instructions. Since a data dependency graph represents precedence relationships between instructions, the traditional approach is to schedule the sources of dependencies before the targets. The problem arises when the scheduling of a target needs to be delayed either because of unsatisfied precedence relationships with other sources or because of modulo constraints. In such cases, the lifetime of the register between the source and the target is lengthened. This has two negative consequences for the software pipelined loop:

1) Since register lifetimes are lengthened, increased register pressure may result in more register spills.

2) Since the number of times the kernel is unrolled depends on the longest register lifetime, greater code expansion may occur.

This invention addresses this problem by introducing a time-reversed scheduling approach for modulo scheduling. Forms of data dependency graphs, flow graphs etc. have been known for use in various fields requiring data flow analysis such as Operations Research and in optimizing compilers for some time. Time reversed scheduling of of such data flow graphs is a technique that has also been known in various of these fields. However, there is no known prior art which uses or suggests the use of time-reversed data dependency graph scheduling in modulo scheduling a target programs loop instructions in an optimizing compiler.

SUMMARY OF THE INVENTION

The present invention uses an elegant method to determine a reduced instruction execution schedule associated with a data dependency graph for use in modulo scheduling target program instruction loops for a program directed to a target computer platform. This invention is contained in the scheduling section of an optimizing compiler which uses modulo scheduling techniques thereby improving the execution speed of the executable code on a target computer platform.

In one aspect of the invention, a computer controlled method of determining a reduced instruction execution schedule associated with a data dependency graph is disclosed, wherein a time-reversed version of the data dependency graph is used to produce a time-reversed schedule. This time-reversed schedule is then mapped back to physical time values representing the usual forward-scheduling scheme for the instructions in the data dependency graph but with the difference that the time-reversed scheduling operation has has created a better schedule of instructions.

In another aspect of the invention, a computer system is disclosed for use in compiling target computer programs using the aforementioned reverse-time scheduling technique for the data dependency graph, and mapping the time-reverse derived schedules back to physical time schedules.

In yet another aspect of the invention, a computer program product is disclosed, having a computer usable medium having computer readable program code mechanisms embodied therein which include computer readable mechanisms to develop time-reversed schedules for data dependency graphs for use in providing better instruction schedules for use by a compiler mechanism in modulo scheduling instructions for a target computer program.

DESCRIPTION OF THE DRAWINGS

The objects, features and advantages of the system of the present invention will be apparent from the following description in which.

NOTATIONS AND NOMENCLATURE

Figure 1:
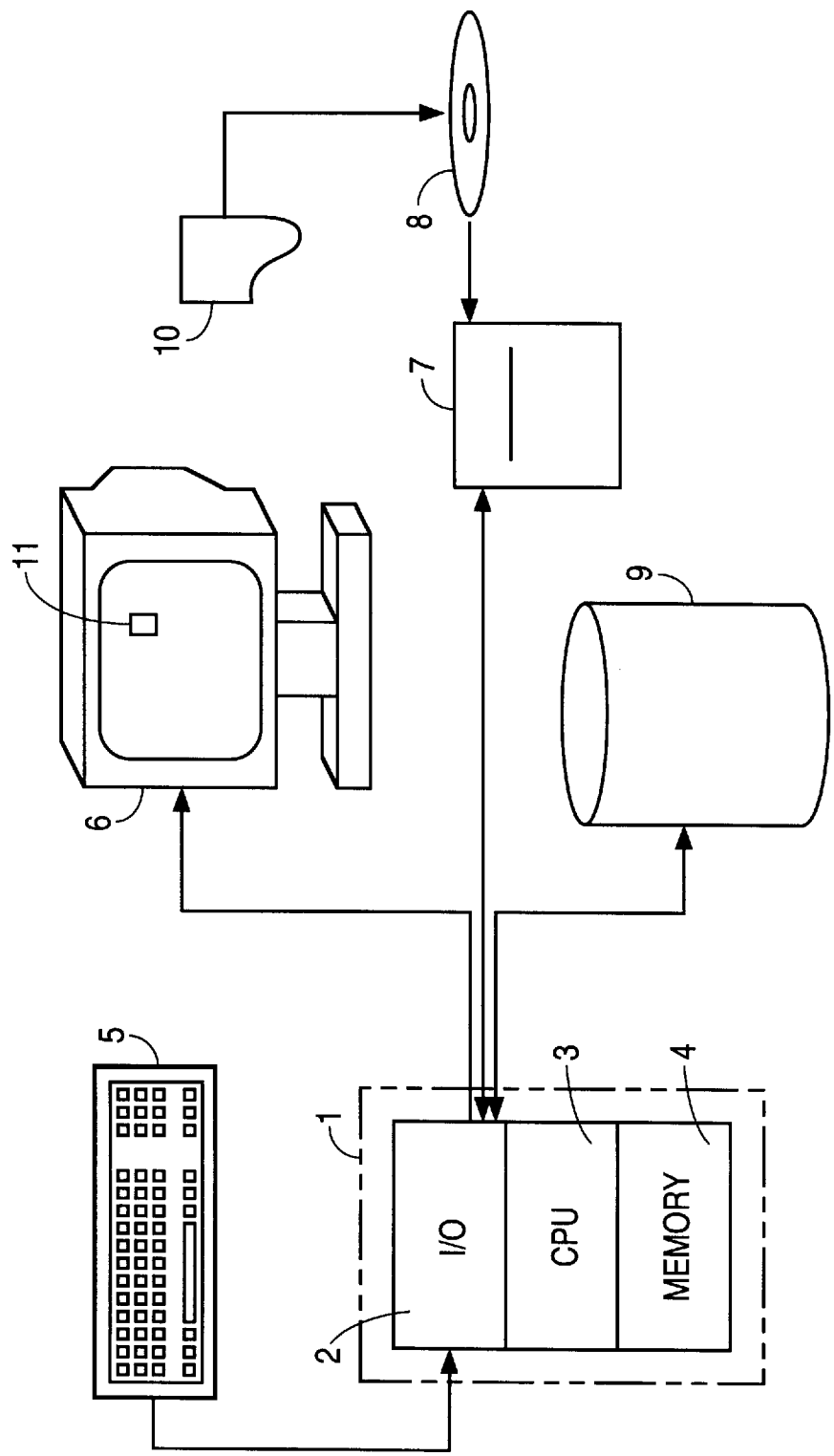
FIG. 1 illustrates a portion of a computer, including a CPU and conventional memory in which the present invention may be embodied.

The detailed descriptions which follow are presented largely in terms of procedures and symbolic representations of operations on data bits within a computer memory. These procedural descriptions and representations are the means used by those skilled in the data processing arts to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be understood, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or similar devices. In all cases there should be understood the distinction between the method operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The procedures presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Apparatus and methods are disclosed for performing time-reversed scheduling of a data dependency graph representing a target program instruction loop in an optimizing compiler. The instruction scheduling function is the modulo scheduling function of an optimizing compiler and it is noted that the time-reverse transforms preserve all modulo constraints. Most modern microprocessors have the ability to issue multiple instructions in one clock cycle and/or possess multiple pipelined functional units and typically contain multi-level memory devices such as on-chip cache, off-chip cache as well as main memory. For such microprocessors this invention can, where applicable, generate more efficient schedules for loops in the target program code. The invention consists of a technique to transform the data dependency graph of the target program instruction loop in order to produce an improved schedule of the loop instructions. It will be apparent to one skilled in the art that the present invention may be practiced without the specific details of this automatic load latency computation disclosed herein. In some instances, well known circuits and devices are shown in block diagram form in order not to obscure the present invention unnecessarily. Similarly, in the preferred embodiment, use is made of SUN Microsystems uni-processor and multi-processor computer systems as well as the SOLARIS operating system, including specifically the ULTRASPARC processor and the SUN SPARC compiler version 4.0, all of which are made and sold by Sun Microsystems, Inc. the assignee of this present invention. However the present invention may be practiced on other computer hardware systems and using other operating systems.

Operating Environment

The environment in which the present invention is used encompasses the general distributed computing system, wherein general purpose computers, workstations, or personal computers are connected via communication links of various types, in a client-server arrangement, wherein programs and data, many in the form of objects, are made available by various members of the system for execution and access by other members of the system. Some of the elements of a general purpose workstation computer are shown in FIG. 1, wherein a processor 1 is shown, having an Input/output ("I/O") section 2, a central processing unit ("CPU") 3 and a memory section 4. The I/O section 2 is connected to a keyboard 5, a display unit 6, a disk storage unit 9 and a CD-ROM drive unit 7. The CD-ROM unit 7 canread a CD-ROM medium 8 which typically contains programs 10 and data.

Figure 2:
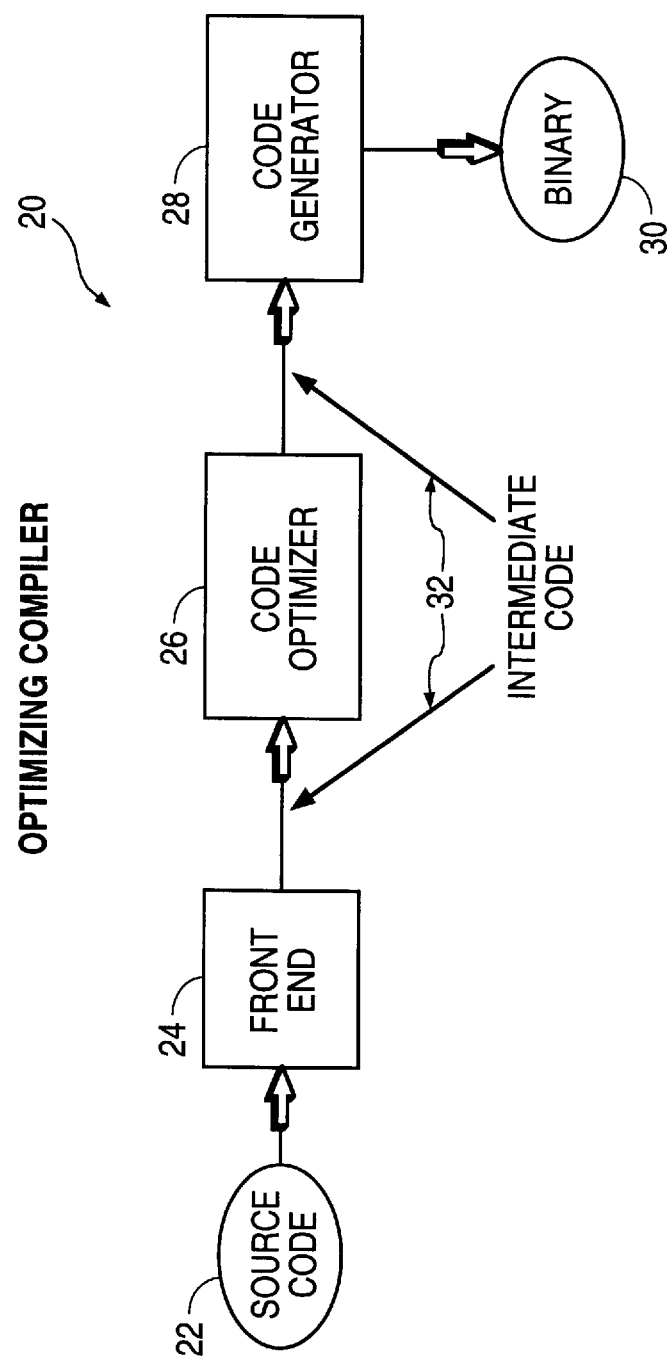
FIG. 2 illustrates a typical compiler showing the position of the code optimizer.

FIG. 2 illustrates a typical optimizing compiler 20, comprising a front end compiler 24, a code optimizer 26 and a back end code generator 28. The front end 24 of a compiler takes as input a program written in a source language 22 and performs various lexical, syntactical and semantic analysis on this language outputting an intermediate set of code 32 representing the target program. This intermediate code 32 is used as input to the code optimizer 26 which attempts to improve the intermediate code so that faster-running machine binary code 30 will result. Some code optimizers 26 are trivial and others do a variety of computations in an attempt to produce the most efficient target program possible. Those of the latter type are called "optimizing compilers" and include such code transformations as common sub-expression elimination, dead-code elimination, renaming of temporary variables and interchange of two independent adjacent statements as well as register allocation.

Figure 3:
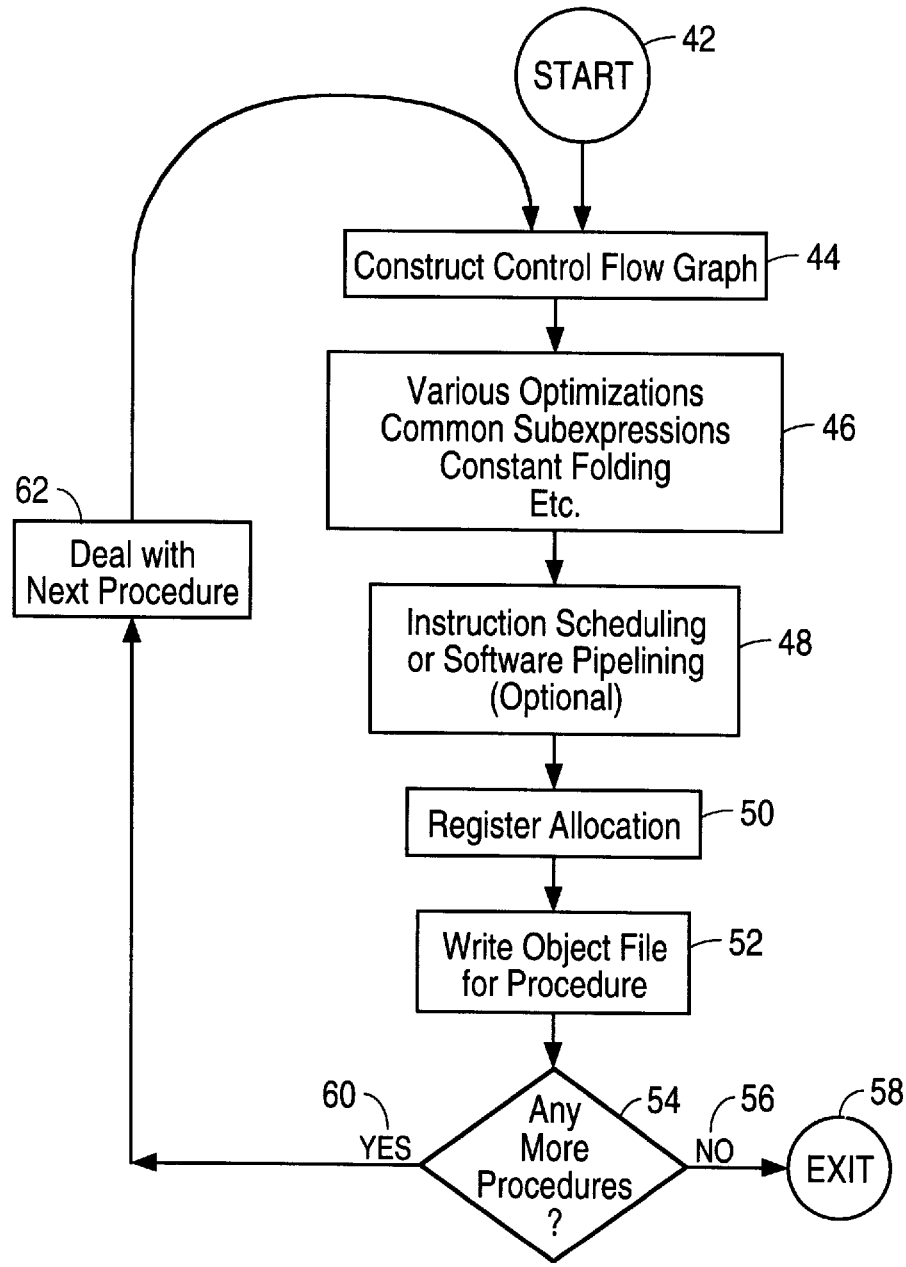
FIG. 3 illustrates a large scale organization of a code optimizer.

FIG. 3 depicts a typical organization of an optimizing compiler 40. On entry of the intermediate code 42 a Control Flow Graph is constructed 44. At this stage the aforementioned code transformations (common sub-expression elimination, dead-code elimination, renaming of temporary variables and interchange of two independent adjacent statements, etc.) take place 46. Next instruction scheduling or "pipelining" may take place 48 at this point. Then "register allocation" is performed 50 and the modified code is written out 52 for the compiler back end to convert it to the binary language of the target machine (i.e. SPARC, X86, etc). It is this "Instruction Scheduling" 48 process which is the focus of applicants' invention.

Modulo Scheduling

Figure 4:
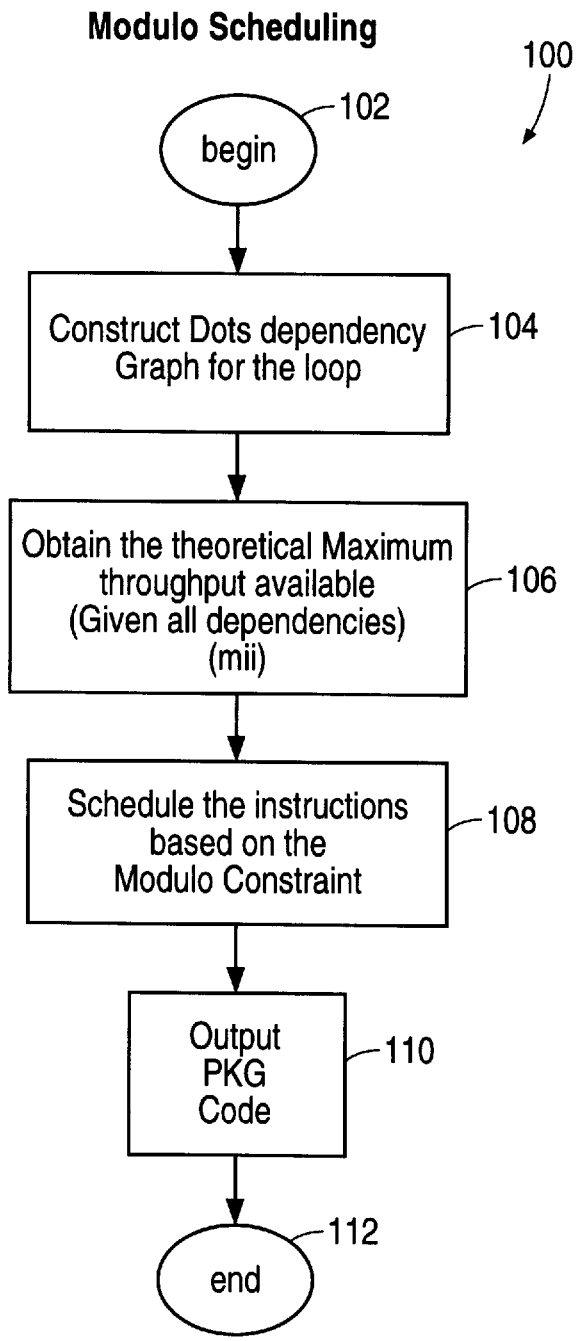
FIG. 4 illustrates an organization of the Instruction Scheduling portion of FIG. 3 as typical in the Prior Art use of modulo scheduling.

Referring now to FIG. 4, a general flow chart of the prior art Optimizing Compiler Modulo Scheduling operation is depicted 100. Upon entry to this section of the Optimizing Compiler 102 incoming intermediate data is processed and the data representing a loop is used to construct a Data Dependency Graph (DDG) 104. Using this DDG the scheduler determines a theoretical maximum throughput possible for this loop, given all the data dependencies and the resource requirements 106. That is, considering the data dependencies of each instruction and the resource requirements (such as a memory port, integer add unit, floating point unit, etc.) a calculation is made to determine the minimum iteration interval (mii) and the recurrence minimum iteration interval (rmii). Next all instructions in the loop are scheduled obeying the modulo constraint 108. The output of the scheduling pass 108 is a schedule in PKE format 110, and the scheduling process for the loop is completed 112.

Brief Summary of Modulo Scheduling

Figure 5:
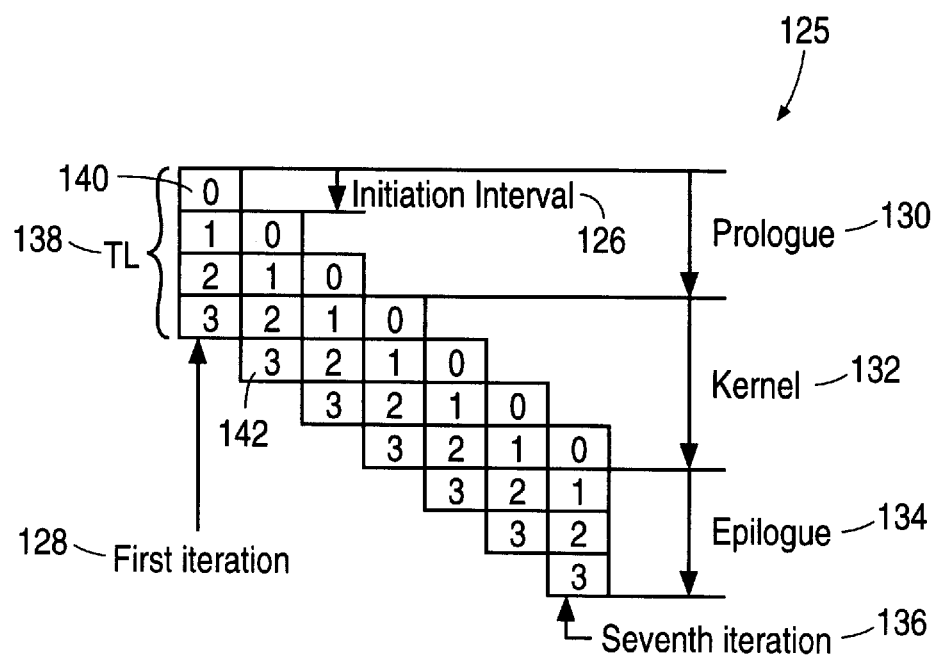
FIG. 5 illustrates a four-stage seven iteration pipeline.

Modulo scheduling has been described in the literature as indicated above. Nevertheless it is helpful at this point to summarize the process for completeness. The key principles are as follows. Parallel instruction processing is obtained by starting an iteration before the previous iteration has completed. The basic idea is to initiate new iterations after fixed time intervals. This time interval is called the initiation interval or the iteration interval (II). FIG. 5 shows the execution of seven iterations of a pipelined loop. If we let the scheduled length of a single iteration be TL 138 and let it be divided into stages each of length II 126. The stage count, SC is defined as, SC=[TL/II], or in this case TL=4 (138 in FIG. 5) and II=1 126 and SC=[4/1]=4. Loop execution begins with stage 0 140 of the first iteration 128. During the first II cycles, no other iteration executes concurrently. After the first II cycles, the first iteration 128 enters stage 1 and the second iteration 142 enters stage 0.

New iterations join every II cycles until a state is reached when all stages of different iterations are executing. Toward the end of loop execution no new iterations are initiated and those that are in various stages of progress gradually complete.

These three phases of loop execution are termed the prologue 130, the kernel 132 and the epilogue 134. During the prologue 130 and the epilogue 134 not all stages of successive iterations execute; this happens only during the kernel phase 132. The prologue 130 and the epilogue 134 last for (SC−1)* II cycles. If the trip count of the loop is large (that is, if the loop is of the type where say 100 iterations of the loop are required), the kernel phase 132 will last much longer than the prologue 130 or the epilogue 134. The primary performance metric for a modulo scheduled loop is the initiation interval, II 126. It is a measure of the steady state throughput for loop iterations. Smaller II values imply higher throughput. Therefore, the scheduler attempts to derive a schedule that minimizes the II. The time to execute n iterations is, T (n)=(n+SC−1)×II. The throughput approaches II as n approaches infinity.

Scheduling proceeds as follows. The data dependence graph (DDG) for the loop is constructed. Nodes in this (directed) graph correspond to instructions, and arcs to dependences between them. Arcs possess two attributes: latency and omega. Latency is the number of clocks of separation required between the source and the destination, and omega is the iteration distance between the two. (That is, if one iteration calculates a value for the destination instruction which is to be used in the next iteration, the omega value would be 1). Prior to scheduling, two bounds on the maximum throughput, the MII and the RMII, are derived. The MII is a bound on the minimum number of cycles needed to complete one iteration and is based only on processor resources. It is a bound determined by the most heavily used resource. For example, if a loop has 10 add operations and the processor can execute at most two adds per clock (that is, it has two add units), then the add unit resource would limit the iteration throughput to at most one iteration every five clocks (that is, 10 add operations devided by 2 add units per clock cycle=5 clock cycles to do the 10 adds). The MII is computed by taking each resource in turn and then taking the maximum of the bounds imposed by each. The RMII is a bound based on the minimum number of clocks needed to complete one iteration and is based only on dependences between nodes. Cycles in the DDG imply that a value Xj computed in some iteration i is used in a future iteration j and is needed to compute the similarly propagated value in iteration j. These circular dependences place a limit on how rapidly iterations can execute because computing the values needed in the cycle takes time. For each elementary cycle in the DDG, the ratio of the sum of the instruction latencies (l) to the sum of the omegas (d) is computed. This value limits the iteration throughput because it takes l clocks to compute values in a cycle that spans d iterations. That is, if a dependency edge i in a cycle has latency $d_i$ and connects operations that are $\Omega_i$ iterations apart, then, RMII=maximum over all elementary cycles of ($\Sigma\ d_i$ cycle edges divided by $\Sigma\Omega_i$ cycle edges).

For example, if an address add self-recurrence takes $\Sigma\ d_i$=3 cycles and generates the address for use in the next iteration (i.e. omega=1) then RMII=3/1=3.

The fixed spacing between overlapped iterations forces a constraint on the scheduler other than the normal constraints imposed by the arcs in the DDG. Note that placing an operation at a time t implies that there exists a corresponding operation in the kth future iteration at (t+k *II). Operations using the same resource must be placed at different times, modulo the II value. This is referred to as the "modulo constraint". It states that if an operation uses a resource at time $t_1$ and another operation uses exactly the same resource at time $t_2$, then $t_1$ and $t_2$ must satisfy "$t_1$modulo II is not equal to $t_2$modulo II". The scheduler begins by attempting to derive a schedule using II=max(MII, RMII). If a schedule is not found, the II is incremented. The process repeats until a schedule is found or an upper limit is reached. After scheduling, the kernel has to be unrolled and definitions renamed to prevent values from successive iterations from overwriting each other. "Unrolling the kernel" is defied as creating multiple copies of the kernel in the generated code. The minimum kernel unroll factor (KUF) needed is determined by the longest value lifetime divided by the II because corresponding new lifetimes begin every II clocks. (The "lifetime" of a value is equal to the time for which a value exists; i.e. from the time its generation is started until the last time it is used or could be used). Remainder iterations (up to KUF−1) use a cleanup loop.

The Problem

Since a data dependency graph represents precedence relationships between instructions, the traditional approach is to schedule the sources of dependencies before the targets. As indicated earlier, the problem arises when the scheduling of a target needs to be delayed either because of unsatisfied precedence relationships with other sources or because of modulo constraints. In such cases, the lifetime of the register between the source and the target is lengthened. This has two negative consequences for the software pipelined loop:

1) Since register lifetimes are lengthened, increased register pressure (i.e. the length of time a value is held in a register increases the likelihood there will be competing demands for use of the register by other instructions) may result in more register spills. A "register spill" occurs when the number of variables that must be manipulated during the execution of the program exceeds the number of registers in the CPU. Such a spill requires the register to store its "old" value, load a newer value, and subsequently reload the "old" value when it is finally required, thereby increasing the necessary instructions which must be scheduled and correspondingly lengthening the target program execution time unnecessarily.

2) Since the number of times the kernel is unrolled depends on the longest register lifetime, greater code expansion may occur.

The Invention—Reverse Time Scheduling the Data Dependency Graph

Figure 6:
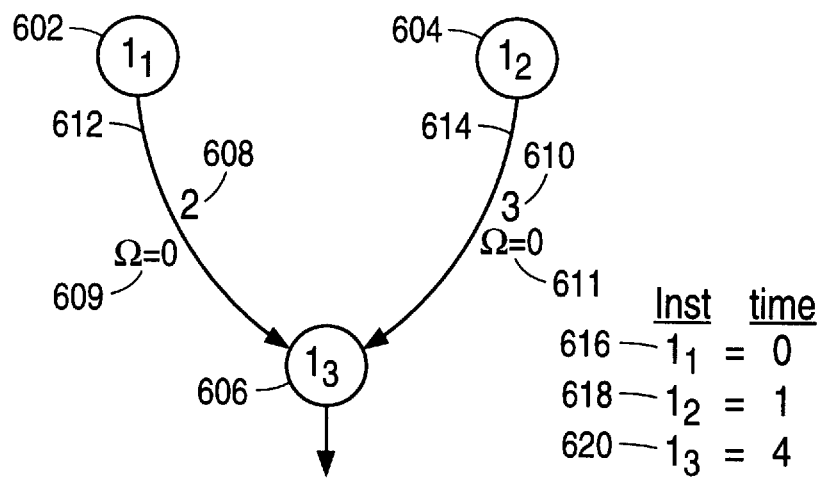
FIGS. 6 and 7 illustrate a simple data dependency graph showing forward dependencies and reverse dependencies.

A typical instruction has two sources, and but only one target. Hence, most dependency graphs are V-shaped such as that shown in FIG. 6. Referring to FIG. 6, a Forward time scheduling of a data Dependency graph is depicted 600. Source instructions $I_1$ 602 and $I_2$ 604 are connected to target instruction $I_3$ 606. Source instruction $I_1$ 602 is connected to target instruction $I_3$ 606 by the dependency arc 612, wherein the arc values indicate a latency of 2 608 and an Omega of 0 609. Similarly source instruction $I_2$ 604 is connected to target instruction $I_3$ 606 by the dependency arc 614, wherein the arc values indicate a latency of 3 610 and an Omega of 0 611. With this type of graph, when using the traditional scheduling approach, when the first source for an instruction is scheduled, (say instruction $I_1$ 602 ) it is unknown when the target will be placed, since the precedence relationship 610 for the other source instruction (instruction $I_2$ 604) has not yet been satisfied. In this case, traditional forward scheduling could proceed like this: first, instruction $I_1$ 602 is scheduled at, say time=0 616; second, instruction $I_2$ 604 is scheduled at the next available clock cycle (time=1) 618; and then, target instruction $I_3$ 606 is scheduled by determining when the source instructions $I_1$ 602 and $I_2$ 604 are complete. Source instruction $I_1$ 602 completes at time=2 (i.e. its start time (0) plus its execution latency (2 608) which is 0+2=2), and source instruction $I_2$ 604 completes at time=4 (i.e. its start time (1) plus its execution latency (3 610) which is 1+3=4). Thus target instruction $I_3$ 606 is scheduled at time=4 620, the earliest time that all sources have completed. Note that if source instruction $I_2$ 604 had fortuitously been scheduled first (i.e. at time =0) then it would have completed at time=3 (i.e. its start time (0) plus its execution latency (3 610) which is 0+3=3) and instruction $I^1$ 602 would then have started at time=1 and would have complete at time=3 (i.e. its start time (1) plus its execution latency (2 608) which is 1+2=3), and thus target instruction $I_3$ 606 would be scheduled at time=3, the earliest time that all sources would have completed. This illustrates the problem with traditional forward scheduling, in that the shortest schedule will only occur fortuitously if the scheduling system happens to randomly always pick the best source instruction to schedule first. Unfortunately the forward scheduling techniques in the prior art statistically do not perform this way.

Figure 7:
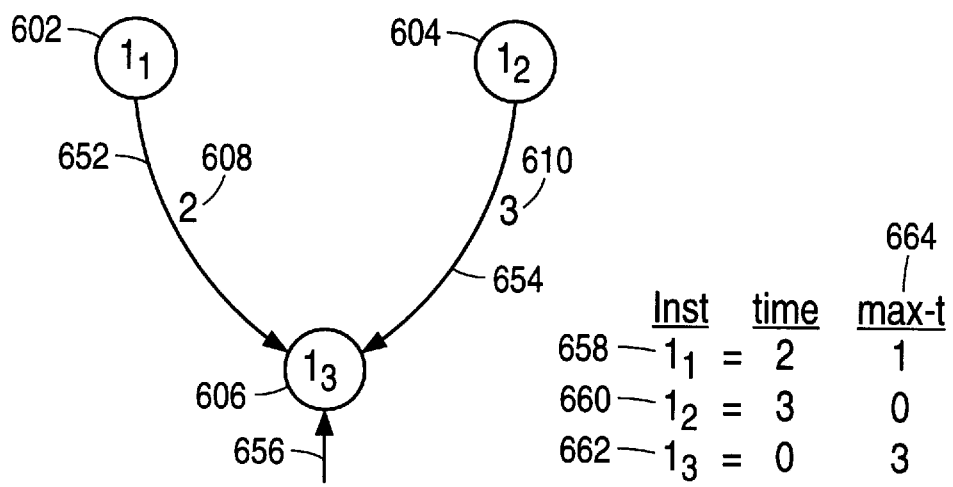

A time-reversed scheduling process (650 in FIG. 7) on average results in tighter schedules thereby reducing both the register pressure and code expansion in a modulo-scheduled loop. In order to perform time-reversed scheduling, the data-dependency graph for the loop is first reversed by changing the directions on all the precedence arcs in the graph. Referring now to FIG. 7, the arc 652 connecting instructions $I_1$ 602 and $I_3$ 606 is depicted as running from I3 606 to $I_1$ 602 and the arc 654 connecting instructions $I_2$ 604 and $I_3$ 606 is depicted as running from $I_3$ 606 to $I_2$ 604. In this reversed graph, precedence relationships now originate from the old targets, and terminate at the old sources. It should be noted that this reversal transformation preserves all modulo constraints as will be shown in more detail below. The reversed graph is scheduled using the traditional approach. For example, the "source" instruction (as indicated by the direction of the arcs) is instruction $I_3$ 606 and as before it is scheduled at time=0 662. Next instruction $I_1$ 602 is scheduled by taking the time (0) of its source ($I_3$ 606) plus the execution latency value (2) 608 on the connecting arc 652 for a schedule time of 0+2=2 658. Similarly next instruction $I_2$ 604 is scheduled by taking the time (0) of its source ($I_3$ 606) plus the execution latency value (3) 610 on the connecting arc 654 for a schedule time of 0+3=3 660. These reversed schedule times (658, 660 and 662) are now transformed back into forward schedule times by the following process; first, the maximum schedule time is found (in this case 3 660) then all schedule time values are converted by subtracting the reverse scheduled time for an instruction from the maximum reversed schedule time and using the result at that instructions forward schedule time. That is, by computing time-forward=time-max minus time-reversed. referring again to FIG. 7 the max time is 3, and the forward time for instruction $I_1$ is 3−2 (its reversed time 658)=1; and the forward time for instruction $I_2$ is 3—3 (its reversed time 660)=0; and the forward time for instruction $I_3$ is 3−0 (its reversed time 662)=3. These adjusted forward values are shown in column "max-t" 664.

The basic idea is that after scheduling, all the instructions in the graph have time-stamps, with the old sources having later time-stamps than the old targets. Now, these time-stamps need to be mapped back to physical time. This is done by finding the largest time-stamp and for each node subtracting its time-stamp from the largest one.

The following formal reasoning explains why all the modulo scheduling constraints remain satisfied within time-reversed scheme.

Consider two nodes A and B of the original dependency graph such as there is an arc from node A to node B with latency L and dependency distance OMEGA. Also say that the current value of the initiation interval is equal to II. And say that node A is scheduled at clock cycle Ta assuming the traditional forward in time scheduling technique. Then for the schedule to be valid the schedule time on node B should satisfy the inequality $$Tb >= Ta + L - OMEGA * II \qquad (1)$$

In the reversed dependency graph the corresponding arc will originate at node B and terminate at node A preserving all other characteristics. Thus the constraint will look like $$Ta' >= Tb' + L - OMEGA * II \qquad (2)$$

where Ta' and Tb' are time stamps in reversed time. However Ta' and Tb' are just values of Tmax−Ta and Tmax−Tb and hence the inequality is equivalent to (1).

Similarly, the modulo constraints also remain invariant. Consider two nodes A and B that must obey a modulo constraint like:

$$(Ta) \text{ modulo II is not equal } (Tb) \text{ modulo II} \qquad (3)$$

Here Ta and Tb are physical clock cycles at which nodes A and B were scheduled.

While scheduling these nodes in reversed time we satisfied the following condition:

$$(Ta') \text{ modulo II is not equal } (Tb') \text{ modulo II} \qquad (4)$$

Since Ta' is Tmax−Ta and Tb' is Tmax−Tb it is clear that (4) implies that (3) also holds true. Therefore reversing arcs on the dependency graph and scheduling nodes in reversed time with later adjustment Tphysical=Tmaximum−Treversed results in a valid schedule.

It will be appreciated by those skilled in the art that various modifications and alterations may be made in the preferred embodiment disclosed herein without departing from the scope of the invention. Accordingly, the scope of the invention is not to be limited to the particular invention embodiments discussed above, but should be defined only by the claims set forth below and equivalents thereof.

What is claimed is:

1. A computer controlled method of determining a reduced instruction execution schedule associated with a target program instruction loop, for use in an optimizing compiler in scheduling the executable instructions of a target program, said method comprising the steps of:

a. providing a data dependency graph for the target program instruction loop;

b. reversing direction of dependency arcs in the data dependency graph, wherein a dependency arc is a representation of a relationship between a source instruction node and a target instruction node and wherein a normal direction of said arc is from source instruction to target instruction, a data dependency graph with dependency arcs reversed designated a "time-reversed graph;"

c. determining an execution time schedule for all instructions in the time-reversed graph, wherein instruction execution times are designated "time-reversed times"; and d. mapping said time-reversed times into physical times for each instruction in the data dependency graph, and using said physical times for modulo scheduling the target program instruction loop represented by the data dependency graph.

2. The method of claim 1 wherein the step of reversing direction of dependency arcs in the data dependency graph comprises the steps of:

for each instruction node in the data dependency graph, identifying all arcs coming into said each instruction node and identifying all arcs going out from said each instruction node, and chancing said all arcs coming into said each instruction node to outgoing arcs and changing said all arcs going out from said each instruction node to incoming arcs.

3. The method of claim 1 wherein the step of determining an execution time schedule for all instructions in the time-reversed graph comprises the steps of:

setting a start time for an instruction to a value equal to a largest time value of all incoming arcs to said instruction, where a time value for an incoming arc is equal to a start time of a source instruction on said incoming arc plus a latency value for said incoming arc; and setting similar start times for all instructions in the graph.

4. The method of claim 1 wherein the step of mapping said time-reversed times into physical times for each instruction in the data dependency graph comprises the steps of;

finding a largest value for a start time in said time-reversed times; and for each of the time-reversed times, replacing a designated time-reversed time value with a physical time value equal to said largest value for a start time in said time-reversed times minus said designated time-reversed time value.

5. A computer controlled method of determining a reduced instruction execution schedule associated with a target program instruction loop, for use in an optimizing compiler in scheduling the executable instructions of a target program, said method comprising the steps of:

a. providing a data dependency graph for the target program instruction loop;

b. reversing direction of dependency arcs in the data dependency graph, wherein a dependency arc is a representation of a relationship between a source instruction node and a target instruction node and wherein a normal direction of said arc is from source instruction to target instruction, a data dependency graph with dependency arcs reversed designated a "time-reversed graph, wherein said reversing direction of dependency arcs in the data dependency graph comprises the steps of:

for each instruction node in the data dependency graph, identifying all arcs coming into said each instruction node and identifying all arcs going out from said each instruction node, and chancing said all arcs coming into said each instruction node to outgoing arcs and changing said all arcs going out from said each instruction node to incoming arcs;

c. determining an execution time schedule for all instructions in the time-reversed graph, wherein instruction execution times are designated "time-reversed times", wherein said determining an execution time schedule for all instructions in the time-reversed graph comprises the steps of:

setting a start time for an instruction to a value equal to a largest time value of all incoming arcs to said instruction, where a time value for an incoming arc is equal to a start time of a source instruction on said incoming arc plus a latency value for said incoming arc; and setting similar start times for all instructions in the graph; and d. mapping said time-reversed times into physical times for each instruction in the data dependency graph, and using said physical times for modulo scheduling the target program instruction loop represented by the data dependency graph, wherein said mapping said time-reversed times into physical times for each instruction in the data dependency graph comprises the steps of;

finding a largest value for a start time in said time-reversed times; and for each of the time-reversed times, replacing a designated time-reversed time value with a physical time value equal to said largest value for a start time in said time-reversed times minus said designated time-reversed time value.

6. A computer system having a central processing unit (CPU) and random access memory (RAM) coupled to said CPU, for use in compiling a target program to run on a target computer architecture, said computer system comprising:

a compiler system resident in said computer system having a front end compiler, a code optimizer and a back end code generator;

a graph determination mechanism configured to produce a data dependency graph for at least a portion of the target program instructions to be scheduled, said graph determination mechanism coupled to said code optimizer;

a time-reversal mechanism configured to reverse all dependency arcs in said data dependency graph, so that for each instruction node all original incoming arcs become new outgoing arcs and all original outgoing arcs become new incoming arcs, producing thereby a time-reversed data dependency graph;

a time-reversed graph scheduling mechanism coupled to said time-reversal mechanism configured to schedule all instructions in said time-reversed data dependency graph;

a physical time mapping mechanism coupled to said graph scheduling mechanism configured to map all instruction scheduled times produced by said time-reversed graph scheduling mechanism into physical times corresponding to forward-scheduled instruction schedule times; and a modulo scheduler mechanism coupled to said code optimizer configured to modulo schedule instructions for said target program by using said determined physical times for all instructions to be scheduled.

7. An apparatus for optimizing the execution time of executable instructions in a target program which is designated to run on a target computer architecture, said apparatus comprising:

a computer having a processor, a memory, and an input/output section;

a compiler system resident in said computer memory having a front end compiler, a code optimizer and a back end code generator;

a graph determination mechanism configured to produce a data dependency graph for at least a portion of the target program instructions to be scheduled, said graph determination mechanism coupled to said code optimizer;

a time-reversal mechanism configured to reverse all dependency arcs in said data dependency graph, so that for each instruction node all original incoming arcs become new outgoing arcs and all original outgoing arcs become new incoming arcs, producing thereby a time-reversed data dependency graph;

a time-reversed graph scheduling mechanism coupled to said time-reversal mechanism configured to schedule all instructions in said time-reversed data dependency graph;

a physical time mapping mechanism coupled to said graph scheduling mechanism configured to map all instruction scheduled times produced by said time-reversed graph scheduling mechanism into physical times corresponding to forward-scheduled instruction schedule times; and a modulo scheduler mechanism coupled to said code optimizer configured to modulo schedule instructions for said target program by using said determined physical times for all instructions to be scheduled.

8. A computer program product comprising:

a computer usable medium having computer readable program code mechanisms embodied therein to schedule the executable instructions of a target program directed at a target computer architecture, the computer readable program code mechanisms in said computer program product comprising:

a computer readable compiler system resident in said computer system having a front end compiler, a code optimizer and a back end code generator;

a computer readable graph determination mechanism to produce a data dependency graph for at least a portion of the target program instructions to be scheduled, said graph determination mechanism coupled to said code optimizer said graph determination mechanism coupled to said code optimizer;

a computer readable time-reversal mechanism configured to reverse all dependency arcs in said data dependency graph, so that for each instruction node all original incoming arcs become new outgoing arcs and all original outgoing arcs become new incoming arcs, producing thereby a time-reversed data dependency graph;

a computer readable time-reversed graph scheduling mechanism coupled to said time-reversal mechanism configured to schedule all instructions in said time-reversed data dependency graph;

a computer readable physical time mapping mechanism coupled to said graph scheduling mechanism configured to map all instruction scheduled times produced by said time-reversed graph scheduling mechanism into physical times corresponding to forward-scheduled instruction schedule times; and a computer readable modulo scheduler mechanism coupled to said code optimizer configured to modulo schedule instructions for said target program by using said determined physical times for all instructions to be scheduled.

* * * * *